United States Patent
Xu et al.

(10) Patent No.: US 10,560,686 B2
(45) Date of Patent: Feb. 11, 2020

(54) PHOTOGRAPHING DEVICE AND METHOD FOR OBTAINING DEPTH INFORMATION

(71) Applicant: HUAWEI TECHNOLOGIES CO., LTD., Shenzhen (CN)

(72) Inventors: Yu Xu, Taipei (TW); Mouzheng Fu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/739,600

(22) PCT Filed: Jun. 23, 2015

(86) PCT No.: PCT/CN2015/082134
§ 371 (c)(1),
(2) Date: Dec. 22, 2017

(87) PCT Pub. No.: WO2016/206004
PCT Pub. Date: Dec. 29, 2016

(65) Prior Publication Data
US 2018/0184071 A1    Jun. 28, 2018

(51) Int. Cl.
*G06T 15/00* (2011.01)
*H04N 13/271* (2018.01)
*H04N 13/128* (2018.01)

(52) U.S. Cl.
CPC ........ *H04N 13/271* (2018.05); *H04N 13/128* (2018.05)

(58) Field of Classification Search
CPC ........ G06T 19/00; G06T 17/20; G06T 17/00; G06T 15/10; G06T 15/00
(Continued)

(56) References Cited

U.S. PATENT DOCUMENTS

| | | | |
|---|---|---|---|
| 8,446,470 B2 * | 5/2013 | Lu | H04N 5/2258 348/148 |
| 2005/0046584 A1 * | 3/2005 | Breed | B60C 11/24 340/13.31 |

(Continued)

FOREIGN PATENT DOCUMENTS

| CN | 102385237 A | 3/2012 |
|---|---|---|
| CN | 103796004 A | 5/2014 |

(Continued)

OTHER PUBLICATIONS

Foreign Communication From a Counterpart Application, Japanese Application No. 2017-566654, Japanese Office Action dated Dec. 18, 2018, 3 pages.

(Continued)

*Primary Examiner* — Gordon G Liu
(74) *Attorney, Agent, or Firm* — Conley Rose, P.C.

(57) ABSTRACT

A photographing device and a method are provided for obtaining depth information, where a binocular manner and a structured light manner are combined, and full depth information of a target object can be obtained. The method may include: obtaining, when a distance between a target object and a photographing device is greater than an effective distance of a structured light manner, depth information of the target object by using a binocular manner; and obtaining, when the distance between the target object and the photographing device is less than an effective distance of the binocular manner, the depth information of the target object by using the structured light manner.

18 Claims, 4 Drawing Sheets

---

501 — Obtain, when a distance between a target object and a photographing device is greater than an effective distance of a structured light manner, depth information of the target object by using a binocular manner 502 — Obtain, when the distance between the target object and the photographing device is less than an effective distance of the binocular manner, the depth information of the target object by using the structured light manner

(58) Field of Classification Search
USPC .......................................................... 345/419
See application file for complete search history.

(56) References Cited

U.S. PATENT DOCUMENTS

| | | |
|---|---|---|
| 2005/0285966 A1 | 12/2005 | Bamji et al. |
| 2012/0056982 A1 | 3/2012 | Katz et al. |
| 2013/0083008 A1* | 4/2013 | Geisner ................ G06T 19/006 345/419 |
| 2013/0194390 A1* | 8/2013 | Hirooka ............... G01C 11/025 348/47 |
| 2013/0329052 A1 | 12/2013 | Chew |
| 2014/0028804 A1* | 1/2014 | Usuda .................. G01S 17/023 348/47 |
| 2015/0116460 A1 | 4/2015 | Jouet et al. |
| 2015/0229911 A1 | 8/2015 | Ge et al. |

FOREIGN PATENT DOCUMENTS

| | | |
|---|---|---|
| CN | 103971405 A | 8/2014 |
| CN | 104581124 A | 4/2015 |
| CN | 204392458 U | 6/2015 |
| JP | 2007526453 A | 9/2007 |
| JP | 2013156109 A | 8/2013 |
| WO | 2005072358 A2 | 8/2005 |
| WO | 2006036398 A2 | 4/2006 |

OTHER PUBLICATIONS

Foreign Communication From a Counterpart Application, Japanese Application No. 2017-566654, English Translation of Japanese Office Action dated Dec. 18, 2018, 3 pages.
First Office Action issued in corresponding Chinese Patent Application No. 201580021737.4, dated Jan. 3, 2018, 5 pages.
International Search Report (including English translation) issued in corresponding International Application No. PCT/CN2015/082134, dated Mar. 22, 2016, 5 pages.
Kazmi, W., et al.,"Indoor and outdoor depth imaging of leaves with time-of-flight and stereo vision sensors: Analysis and comparison," XP055244571, ISPRS Journal of Photogrammetry and Remote Sensing, vol. 88, Feb. 1, 2014, 20 pages.
Foreign Communication From a Counterpart Application, European Application No. 15895904.9, Extended European Search Report dated Apr. 23, 2018, 11 pages.

* cited by examiner

PHOTOGRAPHING DEVICE AND METHOD FOR OBTAINING DEPTH INFORMATION

CROSS-REFERENCE TO RELATED APPLICATION

This application is a national stage of International Application No. PCT/CN2015/082134, filed on Jun. 23, 2015, which is hereby incorporated by reference in its entirety.

TECHNICAL FIELD

The present invention relates to the field of image processing, and in particular, to a photographing device and method for obtaining depth information.

BACKGROUND

A depth map (English: Depth map) is an image representation form of presenting a distance from a focal plane to each point on an image by using a gray-scale diagram. For example, FIG. 1A is a three-dimensional view of a character, and FIG. 1B is a depth map of the character that is obtained based on FIG. 1A. When objects are at a same color level, it indicates that the objects are on a same focal plane, lighter gray indicates that an object is closer to the focal plane, and darker gray indicates that an object is farther away from the focal plane. During drawing of a depth map, a distance from a focal plane to each point of an object at a photographing moment, that is, depth information, usually needs to be measured or calculated.

Generally, there are three manners of obtaining depth information: a dual-camera/binocular manner, a structured light manner, and a time of flight (English: Time of Flight, ToF for short) manner.

In the binocular manner, at least two cameras are used to acquire an image, and a distance from each point on the image to a focal plane is calculated by using a triangle location algorithm, so as to obtain depth information.

However, due to the triangle location algorithm and a structural layout of the cameras, when a distance between a target object and a focal plane is less than a given value, depth information of the target object cannot be obtained by using the binocular manner, where the given value is referred to as a blind distance.

In the structured light manner, an infrared light source is generally used to light a target object, a particular pattern is projected to the target object, and depth information of each pixel point is calculated by using an offset of the pattern.

However, the structured light manner needs an infrared camera and an infrared light source, and the structured light manner has a relatively high requirement on a projected pattern, and is easily affected by an outdoor light source. As a measured distance is affected by a lighting source, the structured light manner is limited to being used in an indoor and short-distance scenario, for example, within a distance of 3 meters (unit: m). Once a distance between a target object and a focal plane exceeds a given distance, depth information cannot be obtained.

In the ToF manner, a phase of an infrared light source is modulated, and a phase offset of a received image is measured, so that depth information is measured.

Same as the structured light manner, the ToF manner also needs an infrared camera and an infrared light source, and the ToF manner is limited to being used in an indoor and short-distance scenario.

Therefore, due to respective limitations of the binocular manner, the structured light manner, and the ToF manner, regardless of which manner is used, it is possible that depth information of a target object cannot be obtained.

SUMMARY

Embodiments of the present invention provide a photographing device and method for obtaining depth information, so as to resolve a problem possibly occurring in the prior art that depth information of a target object cannot be obtained.

According to a first aspect, the present invention provides a photographing device, including:

a first image sensor, a second image sensor, an infrared light source, and a processor, where the first image sensor is configured to acquire an infrared light image and a visible light image; and the first image sensor includes M infrared light sensing pixels and N visible light sensing pixels;

the second image sensor is configured to acquire a visible light image;

the infrared light source is configured to project a particular pattern to a target object; and the processor is configured to perform the following operations: obtaining, when a distance between the target object and the photographing device is greater than an effective distance of a structured light manner, depth information of the target object by using a binocular manner; and obtaining, when the distance between the target object and the photographing device is less than an effective distance of the binocular manner, the depth information of the target object by using the structured light manner.

With reference to the first aspect, in a first possible implementation manner of the first aspect, the obtaining, when a distance between the target object and the photographing device is greater than an effective distance of a structured light manner, depth information of the target object by using a binocular manner; and obtaining, when the distance between the target object and the photographing device is less than an effective distance of the binocular manner, the depth information of the target object by using the structured light manner includes:

obtaining the depth information of the target object by using the binocular manner; and obtaining, if the depth information of the target object cannot be obtained by using the binocular manner, the depth information of the target object by using the structured light manner.

With reference to the first aspect, in a second possible implementation manner of the first aspect, the obtaining, when a distance between the target object and the photographing device is greater than an effective distance of a structured light manner, depth information of the target object by using a binocular manner; and obtaining, when the distance between the target object and the photographing device is less than an effective distance of the binocular manner, the depth information of the target object by using the structured light manner includes:

obtaining the depth information of the target object by using the structured light manner; and obtaining, if the depth information of the target object cannot be obtained by using the structured light manner, the depth information of the target object by using the binocular manner.

With reference to the first aspect or the first or the second possible implementation manner of the first aspect, in a third possible implementation manner of the first aspect, the obtaining, when a distance between the target object and the photographing device is greater than an effective distance of a structured light manner, depth information of the target object by using a binocular manner; and obtaining, when the distance between the target object and the photographing device is less than an effective distance of the binocular manner, the depth information of the target object by using the structured light manner includes:

measuring the distance between the target object and the photographing device;

obtaining, if the distance between the target object and the photographing device is greater than a first preset value, the depth information of the target object by using the binocular manner; and obtaining, if the distance between the target object and the photographing device is less than a second preset value, the depth information of the target object by using the structured light manner.

With reference to any one of the first aspect or the first to the third possible implementation manners of the first aspect, in a fourth possible implementation manner of the first aspect, the obtaining depth information of the target object by using a binocular manner includes:

obtaining a visible light image and an infrared light image of the target object by using the first image sensor, where a pixel value of the visible light image is equal to X, and a pixel value of the infrared light image is equal to Y;

obtaining a first reference image having a pixel value equal to X+Y according to the visible light image and the infrared light image;

obtaining a second reference image of the target object by using the second image sensor, where the second reference image is a visible light image having a pixel value equal to X+Y; and calculating the depth information of the target object according to the first reference image and the second reference image by using a triangle location algorithm.

With reference to any one of the first aspect or the first to the fourth possible implementation manners of the first aspect, in a fifth possible implementation manner of the first aspect, the obtaining the depth information of the target object by using the structured light manner includes:

projecting the particular pattern to the target object by using the infrared light source;

obtaining, by using the first image sensor, a reference pattern that is formed by means of depth modulation of the target object after the particular pattern is projected to the target object; and calculating the depth information of the target object according to the reference pattern.

With reference to any one of the first aspect or the first to the fifth possible implementation manners of the first aspect, in a sixth possible implementation manner of the first aspect, M is equal to ⅓ of N.

With reference to any one of the first aspect or the first to the sixth possible implementation manners of the first aspect, in a seventh possible implementation manner of the first aspect, the effective distance of the binocular manner is one meter.

According to a second aspect, the present invention provides a method for obtaining depth information, including:

obtaining, when a distance between a target object and a photographing device is greater than an effective distance of a structured light manner, depth information of the target object by using a binocular manner; and obtaining, when the distance between the target object and the photographing device is less than an effective distance of the binocular manner, the depth information of the target object by using the structured light manner.

With reference to the second aspect, in a first possible implementation manner of the second aspect, the obtaining, when a distance between a target object and a photographing device is greater than an effective distance of a structured light manner, depth information of the target object by using a binocular manner; and obtaining, when the distance between the target object and the photographing device is less than an effective distance of the binocular manner, the depth information of the target object by using the structured light manner includes:

obtaining the depth information of the target object by using the binocular manner; and obtaining, if the depth information of the target object cannot be obtained by using the binocular manner, the depth information of the target object by using the structured light manner.

With reference to the second aspect, in a second possible implementation manner of the second aspect, the obtaining, when a distance between a target object and a photographing device is greater than an effective distance of a structured light manner, depth information of the target object by using a binocular manner; and obtaining, when the distance between the target object and the photographing device is less than an effective distance of the binocular manner, the depth information of the target object by using the structured light manner includes:

obtaining the depth information of the target object by using the structured light manner; and obtaining, if the depth information of the target object cannot be obtained by using the structured light manner, the depth information of the target object by using the binocular manner.

With reference to the second aspect or the first or the second possible implementation manner of the second aspect, in a third possible implementation manner of the second aspect, the obtaining, when a distance between a target object and a photographing device is greater than an effective distance of a structured light manner, depth information of the target object by using a binocular manner; and obtaining, when the distance between the target object and the photographing device is less than an effective distance of the binocular manner, the depth information of the target object by using the structured light manner includes:

measuring the distance between the target object and the photographing device;

obtaining, if the distance between the target object and the photographing device is greater than a first preset value, the depth information of the target object by using the binocular manner; and obtaining, if the distance between the target object and the photographing device is less than a second preset value, the depth information of the target object by using the structured light manner.

With reference to any one of the second aspect or the first to the third possible implementation manners of the second aspect, in a fourth possible implementation manner of the second aspect, the obtaining depth information of the target object by using a binocular manner includes:

obtaining a visible light image and an infrared light image of the target object by using a first image sensor, where a pixel value of the visible light image is equal to X, and a pixel value of the infrared light image is equal to Y;

obtaining a first reference image having a pixel value equal to X+Y according to the visible light image and the infrared light image;

obtaining a second reference image of the target object by using a second image sensor, where the second reference image is a visible light image having a pixel value equal to X+Y; and calculating the depth information of the target object according to the first reference image and the second reference image by using a triangle location algorithm.

With reference to the fourth possible implementation manner of the second aspect, in a fifth possible implementation manner of the second aspect, the obtaining the depth information of the target object by using the structured light manner includes:

projecting a particular pattern to the target object by using an infrared light source;

obtaining, by using the first image sensor, a reference pattern that is formed by means of depth modulation of the target object after the particular pattern is projected to the target object; and calculating the depth information of the target object according to the reference pattern.

With reference to the fourth or the fifth possible implementation manner of the second aspect, in a sixth possible implementation manner of the second aspect, the first image sensor includes M infrared light sensing pixels and N visible light sensing pixels, where M is equal to ⅓ of N.

With reference to any one of the second aspect or the first to the sixth possible implementation manners of the second aspect, in a seventh possible implementation manner of the second aspect, the effective distance of the binocular manner is one meter.

According to a third aspect, a photographing device includes:

a first obtaining unit, configured to obtain, when a distance between a target object and the photographing device is greater than an effective distance of a structured light manner, depth information of the target object by using a binocular manner; and a second obtaining unit, configured to obtain, when the distance between the target object and the photographing device is less than an effective distance of the binocular manner, the depth information of the target object by using the structured light manner.

With reference to the third aspect, in a first possible implementation manner of the third aspect, the first obtaining unit obtains the depth information of the target object by using the binocular manner; and if the first obtaining unit cannot obtain the depth information of the target object by using the binocular manner, the second obtaining unit obtains the depth information of the target object by using the structured light manner.

With reference to the third aspect, in a second possible implementation manner of the third aspect, the second obtaining unit obtains the depth information of the target object by using the structured light manner; and if the second obtaining unit cannot obtain the depth information of the target object by using the structured light manner, the first obtaining unit obtains the depth information of the target object by using the binocular manner.

With reference to the third aspect or the first or the second possible implementation manner of the third aspect, in a third possible implementation manner of the third aspect, the photographing device further includes:

a measurement unit, configured to measure the distance between the target object and the photographing device, where if the measurement unit determines that the distance between the target object and the photographing device is greater than a first preset value, the first obtaining unit obtains the depth information of the target object by using the binocular manner; and if the measurement unit determines that the distance between the target object and the photographing device is less than a second preset value, the second obtaining unit obtains the depth information of the target object by using the structured light manner.

With reference to any one of the third aspect or the first to the third possible implementation manners of the third aspect, in a fourth possible implementation manner of the third aspect, the first obtaining unit is specifically configured to:

obtain a visible light image and an infrared light image of the target object by using a first image sensor, where a pixel value of the visible light image is equal to X, and a pixel value of the infrared light image is equal to Y;

obtain a first reference image having a pixel value equal to X+Y according to the visible light image and the infrared light image;

obtain a second reference image of the target object by using a second image sensor, where the second reference image is a visible light image having a pixel value equal to X+Y; and calculate the depth information of the target object according to the first reference image and the second reference image by using a triangle location algorithm.

With reference to the fourth possible implementation manner of the third aspect, in a fifth possible implementation manner of the third aspect, the second obtaining unit is specifically configured to:

project a particular pattern to the target object by using an infrared light source;

obtain, by using the first image sensor, a reference pattern that is formed by means of depth modulation of the target object after the particular pattern is projected to the target object; and calculate the depth information of the target object according to the reference pattern.

With reference to the fourth or the fifth possible implementation manner of the third aspect, in a sixth possible implementation manner of the third aspect, the first image sensor includes M infrared light sensing pixels and N visible light sensing pixels, where M is equal to ⅓ of N.

With reference to any one of the third aspect or the first to the sixth possible implementation manners of the third aspect, in a seventh possible implementation manner of the third aspect, the effective distance of the binocular manner is one meter.

According to the solutions provided in the present invention, a binocular manner and a structured light manner are combined, so that a disadvantage of a structured light algorithm that depth information of a long-distance target object cannot be obtained due to interference from outdoor sunlight or a natural light source is avoided, a disadvantage of the binocular manner that depth information of a short-distance target object in a dead zone cannot be obtained is avoided, and full depth information of a target object can be obtained.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention provide a photographing device and method for obtaining depth information. A binocular manner and a structured light manner are combined, so that a disadvantage of a structured light algorithm that depth information of a long-distance target object cannot be obtained due to interference from outdoor sunlight or a natural light source is avoided, a disadvantage of the binocular manner that depth information of a short-distance target object in a dead zone cannot be obtained is avoided, and full depth information of a target object can be obtained.

The following describes the technical solutions of the present invention with reference to the accompanying drawings and the embodiments of this specification.

Figure 1A:
FIG. 1A is a schematic diagram of a three-dimensional view in the prior art.
Figure 1B:
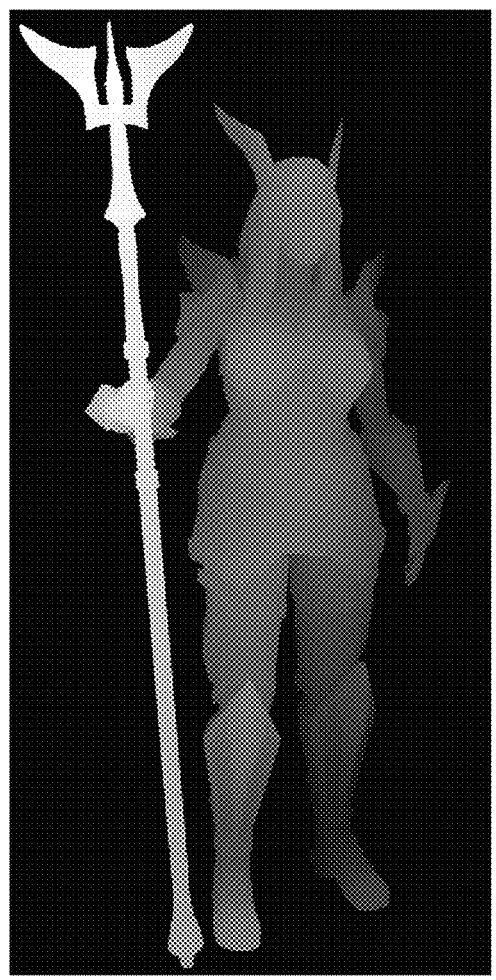
FIG. 1B is a schematic diagram of a depth view in the prior art.
Figure 2:
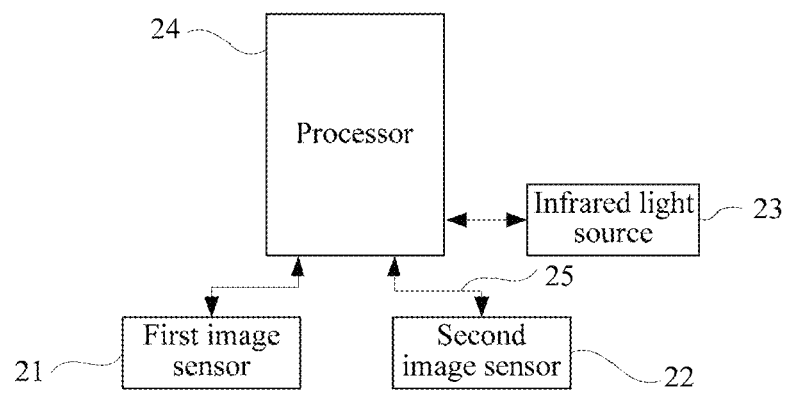
FIG. 2 is a schematic diagram of a photographing device according to an embodiment of the present invention.

Referring to FIG. 2, an embodiment of the present invention provides a photographing device. The photographing device includes a first image sensor 21, a second image sensor 22, an infrared light source 23, and a processor 24. These components perform communication by using one or more communications buses or signal cables 25.

The following describes in detail a terminal device for fingerprint interruption wakeup provided in this embodiment.

The first image sensor 21 is a novel sensor provided in this embodiment of the present invention, and is configured to acquire an infrared light image and a visible light image. The first image sensor includes M infrared light sensing pixels and N visible light sensing pixels.

Figure 3:
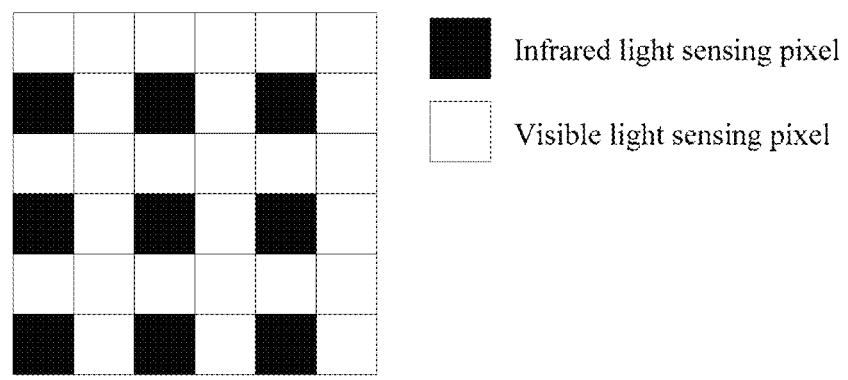
FIG. 3 is a schematic diagram of a novel sensor according to an embodiment of the present invention.

In this embodiment of the present invention, the infrared light sensing pixels and the visible light sensing pixels need to be evenly distributed. For example, when N:M=3:1, it needs to be ensured that every four pixels include one infrared light sensing pixel and three visible light sensing pixels. A location of the infrared light sensing pixel in the four pixels is not limited in this embodiment of the present invention. One pixel distribution case may be shown in FIG. 3, in each area including four pixels, a dark color block at a lower-left location represents the infrared light sensing pixel, and white blocks at the other locations represent the visible light sensing pixels.

The infrared light sensing pixels M and the visible light sensing pixels N in the first image sensor 21 provided in this embodiment of the present invention may be at any ratio. Preferably, in this embodiment of the present invention, it is found by means of multiple simulation tests that when the pixel value M of the infrared light sensing pixels is equal to ⅓ of the pixel value N of the visible light image sensing pixels, depth information obtained by using a binocular manner and a structured light manner can both have desirable precision.

The second image sensor 22 is configured to acquire a visible light image.

Figure 4:
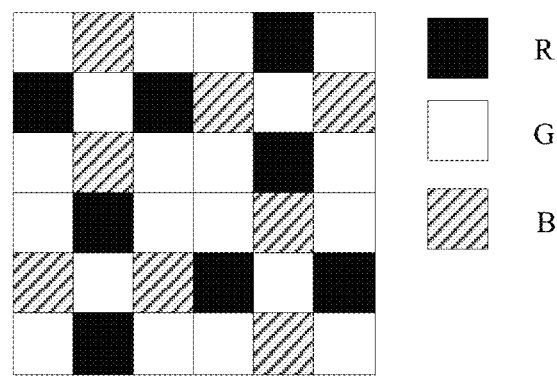
FIG. 4 is a schematic diagram of a sensor in an RGB color mode according to an embodiment of the present invention.

As shown in FIG. 4, FIG. 4 shows an example of RGB color image sensing pixels of the second image sensor 22.

Optionally, to balance a total effective distance supported by the photographing device and power consumption, in this embodiment of the present invention, it is found by means of multiple simulation tests that a layout distance of the two sensors may be adjusted, to set an effective distance of the binocular manner to one meter.

The infrared light source 23 is configured to project a particular pattern to a target object.

The processor 24 is configured to perform the following operations:

obtaining, when a distance between the target object and the photographing device is greater than an effective distance of a structured light manner, depth information of the target object by using a binocular manner; and obtaining, when the distance between the target object and the photographing device is less than an effective distance of the binocular manner, the depth information of the target object by using the structured light manner.

The effective distance of the structured light manner refers to a maximum value of an effective range of the structured light manner; and the effective distance of the binocular manner refers to a minimum value of an effective range of the binocular manner.

Optionally, the processor may first obtain the depth information of the target object by using the binocular manner; and if the depth information of the target object cannot be obtained by using the binocular manner, obtain the depth information of the target object by using the structured light manner.

Optionally, the processor may first obtain the depth information of the target object by using the structured light manner; and if the depth information of the target object cannot be obtained by using the structured light manner, obtain the depth information of the target object by using the binocular manner.

Optionally, the processor may measure the distance between the target object and the photographing device; if the distance between the target object and the photographing device is greater than a first preset value, obtain the depth information of the target object by using the binocular manner; and if the distance between the target object and the photographing device is less than a second preset value, obtain the depth information of the target object by using the structured light manner.

Optionally, when obtaining the depth information of the target object by using the binocular manner, the processor 24 may: obtain a visible light image and an infrared light image of the target object by using the first image sensor 21, where a pixel value of the visible light image is equal to X, and a pixel value of the infrared light image is equal to Y; obtain a first reference image having a pixel value equal to X+Y according to the visible light image and the infrared light image; obtain a second reference image of the target object by using the second image sensor 22, where the second reference image is a visible light image having a pixel value equal to X+Y; and at last, calculate the depth information of the target object according to the first reference image and the second reference image by using a triangle location algorithm.

Because the first image sensor 21 includes the infrared light sensing pixels, the first image sensor 21 and the infrared light source 23 may be jointly applied to a structured light mode for acquiring depth information of a target object within a short-distance range supported by the structured light manner. In addition, because the first image sensor 21 also includes the visible light sensing pixels, the first image sensor 21 and the second image sensor 22 may be jointly applied to the binocular manner for acquiring depth information of a target object within a long-distance range supported by the binocular manner.

In this embodiment of the present invention, depth information of a target object within a range from as short as several millimeters to as long as tens of meters can be obtained by using the infrared light source and the two sensors.

Figure 5:
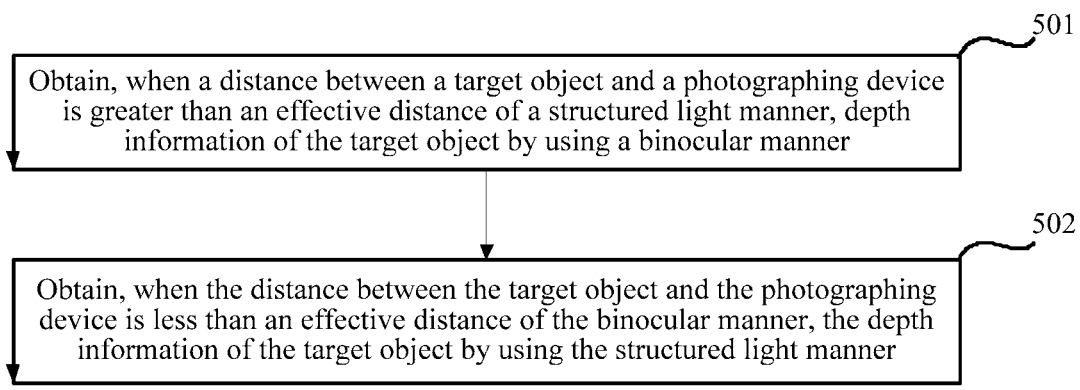
FIG. 5 is a flowchart of obtaining depth information according to an embodiment of the present invention.

Referring to FIG. 5, an embodiment of the present invention provides an implementation process of obtaining depth information by the photographing device:

Step 501: Obtain, when a distance between a target object and the photographing device is greater than an effective distance of a structured light manner, depth information of the target object by using a binocular manner.

A specific manner of obtaining, by the photographing device, the depth information of the target object by using the binocular manner is as follows:

First, the photographing device obtains a visible light image and an infrared light image of the target object by using a first image sensor, where a pixel value of the visible light image is equal to X, and a pixel value of the infrared light image is equal to Y.

Second, the photographing device obtains a first reference image having a pixel value equal to X+Y according to the visible light image and the infrared light image.

For example, the photographing device may obtain the first reference image by using an interpolation compensation method. The first image includes the infrared light image that is meaningless to the binocular manner. Therefore, the infrared light image needs to be extracted, and luminance of a pixel in which the original infrared light image is located is estimated according to the interpolation compensation method and the visible light image having the pixel value equal to X, so that the visible light image having the pixel value equal to X+Y is obtained.

Third, the photographing device obtains a second reference image of the target object by using a second image sensor, where the second reference image is a visible light image having a pixel value equal to X+Y.

At last, the photographing device calculates the depth information of the target object according to the first reference image and the second reference image by using a triangle location algorithm.

Step 502: Obtain, when the distance between the target object and the photographing device is less than an effective distance of the binocular manner, the depth information of the target object by using the structured light manner.

A specific manner of obtaining, by the photographing device, the depth information of the target object by using the structured light manner is as follows:

First, the photographing device projects a particular pattern to the target object by using an infrared light source.

Next, the photographing device obtains, by using the first image sensor, a reference pattern that is formed by means of depth modulation of the target object after the particular pattern is projected to the target object.

At last, the photographing device calculates the depth information of the target object according to the reference pattern and the initial particular pattern.

In the prior art, the binocular manner needs at least two sensors to acquire an image, and the structured light manner needs one extra infrared sensor. Therefore, in this embodiment of the present invention, at least three sensors are needed theoretically as the binocular manner and the structured light manner are combined. However, in this embodiment of the present invention, the infrared light sensing pixels and the visible light sensing pixels are integrated into a novel sensor, so that the novel sensor can have functions of both a conventional sensor and an infrared sensor. Therefore, full depth information of a target object can be obtained by using the binocular manner and the structured light manner by using only two sensors.

An order of step 501 and step 502 is not limited in this embodiment of the present invention. For example, the photographing device may first obtain the depth information of the target object by using the binocular manner; and if the depth information of the target object cannot be obtained by using the binocular manner, obtain the depth information of the target object by using the structured light manner.

Alternatively, the photographing device may first obtain the depth information of the target object by using the structured light manner; and if the depth information of the target object cannot be obtained by using the structured light manner, obtain the depth information of the target object by using the binocular manner.

Optionally, the photographing device may measure the distance between the target object and the photographing device; if the distance between the target object and the photographing device is greater than a first preset value, obtain the depth information of the target object by using the binocular manner; and if the distance between the target object and the photographing device is less than a second preset value, obtain the depth information of the target object by using the structured light manner. The photographing device may measure the distance between the target object and the photographing device by using laser ranging, radar ranging, or another distance measurement method. The first preset value and the second preset value may be equal or not equal.

The infrared light sensing pixels M and the visible light sensing pixels N in the novel sensor provided in this embodiment of the present invention may be at any ratio. Preferably, in this embodiment of the present invention, it is found by means of multiple simulation tests that when the pixel value M of the infrared light sensing pixels is equal to ⅓ of the pixel value N of the visible light sensing pixels, depth information obtained by using the binocular manner and the structured light manner can both have desirable precision.

For example, assuming that infrared light sensing pixels: visible light sensing pixels=1:3 in a novel sensor, and a total pixel value of the novel sensor is 3 million, the pixel value of 3 million includes 750 thousand infrared light sensing pixels and 2.25 million visible light sensing pixels.

Optionally, to reduce power consumption of the photographing device, a maximum value of an effective range of the structured light manner may be set to a minimum value of an effective range of the binocular manner.

For example, assuming that a photographing device may be configured to obtain depth information of a target object with a range from A to B (A<B) when using the structured light manner, and may be configured to obtain depth information of a target object with a range from C to D (C<D) when using the binocular manner, power of an infrared projector of the photographing device may be adjusted, so that B is equal to C. In this case, the photographing device may obtain depth information of an object within a range from A to B/C to D by combining a structured light algorithm and a binocular algorithm. A to B/C is a dead zone of the binocular manner, and B/C to D is a depth area that cannot be detected by using the structured light manner.

When a layout distance of the two sensors on the photographing device is farther, the effective distance of the binocular manner is larger, but a dead zone of the binocular manner may increase correspondingly. Therefore, power of the structured light manner needs to be increased, to enlarge the effective distance of the structured light manner. To balance a total effective distance supported by the photographing device and power consumption, in this embodiment of the present invention, it is found by means of multiple simulation tests that the layout distance of the two sensors may be adjusted, to set the effective distance of the binocular manner to one meter.

Figure 6:
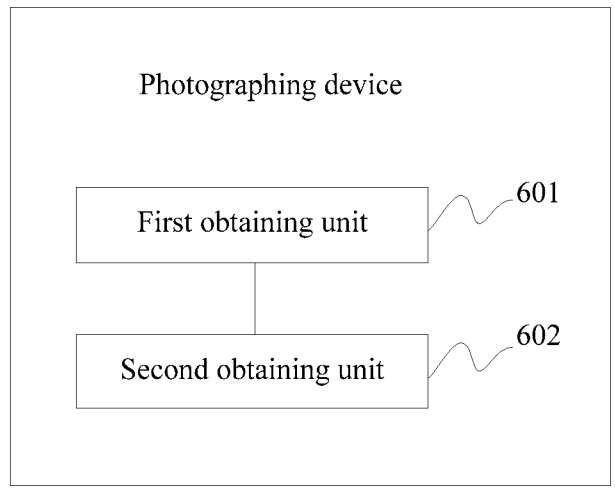
FIG. 6 is a schematic structural diagram of a photographing device according to an embodiment of the present invention.

Referring to FIG. 6, an embodiment of the present invention provides a photographing device, configured to implement the method for obtaining depth information shown in FIG. 5 of the present invention, and the photographing device includes:

a first obtaining unit 601, configured to obtain, when a distance between a target object and the photographing device is greater than an effective distance of a structured light manner, depth information of the target object by using a binocular manner; and a second obtaining unit 602, configured to obtain, when the distance between the target object and the photographing device is less than an effective distance of the binocular manner, the depth information of the target object by using the structured light manner.

Optionally, the first obtaining unit 601 may first obtain the depth information of the target object by using the binocular manner; and if the first obtaining unit 601 cannot obtain the depth information of the target object by using the binocular manner, the second obtaining unit 602 obtains the depth information of the target object by using the structured light manner.

Optionally, the second obtaining unit 602 may first obtain the depth information of the target object by using the structured light manner; and if the second obtaining unit 602 cannot obtain the depth information of the target object by using the structured light manner, the first obtaining unit 601 obtains the depth information of the target object by using the structured light manner.

Optionally, the photographing device may further include:

a measurement unit, configured to measure the distance between the target object and the photographing device, where if the measurement unit determines that the distance between the target object and the photographing device is greater than a first preset value, the first obtaining unit 601 obtains the depth information of the target object by using the binocular manner; and if the measurement unit determines that the distance between the target object and the photographing device is less than a second preset value, the second obtaining unit 602 obtains the depth information of the target object by using the structured light manner.

Optionally, the first obtaining unit 601 is specifically configured to: obtain a visible light image and an infrared light image of the target object by using a first image sensor, where a pixel value of the visible light image is equal to X, and a pixel value of the infrared light image is equal to Y; obtain a first reference image having a pixel value equal to X+Y according to the visible light image and the infrared light image; obtain a second reference image of the target object by using a second image sensor, where the second reference image is a visible light image having a pixel value equal to X+Y; and calculate the depth information of the target object according to the first reference image and the second reference image by using a triangle location algorithm.

Optionally, the second obtaining unit 602 is specifically configured to: project a particular pattern to the target object by using an infrared light source; obtain, by using the first image sensor, a reference pattern that is formed by means of depth modulation of the target object after the particular pattern is projected to the target object; and calculate the depth information of the target object according to the reference pattern.

Optionally, the first image sensor includes M infrared light sensing pixels and N visible light sensing pixels, where M is equal to ⅓ of N.

Optionally, the effective distance of the binocular manner is one meter.

In conclusion, according to the technical solutions provided in the embodiments of the present invention, a novel sensor including infrared light sensing pixels and visible light sensing pixels is provided, and a binocular manner and a structured light manner can be combined by further using an infrared light source and another sensor, so that a disadvantage of a structured light algorithm that depth information of a long-distance target object cannot be obtained due to interference from outdoor sunlight or a natural light source is avoided, a disadvantage of the binocular manner that depth information of a short-distance target object in a dead zone cannot be obtained is avoided, and depth information of an object within a range from as short as several millimeters to as long as tens of meters can be obtained.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A photographing device, comprising:
a first image sensor comprising M infrared light sensing pixels and N visible light sensing pixels, wherein the first image sensor is configured to acquire an infrared light image and first a visible light image, wherein a pixel value of the first visible light image is equal to X, and wherein a pixel value of the infrared light image is equal to Y;
a second image sensor configured to acquire a second visible light image;
an infrared light source configured to project a particular pattern to a target object; and
a processor coupled to the first image sensor, the second image sensor, and the infrared light source, wherein the processor is configured to:
obtain depth information of the target object using a binocular manner when a distance between the target object and the photographing device is greater than an effective distance of a structured light manner by:
obtaining the first visible light image and the infrared light image of the target object from the first image sensor;
obtaining a first reference image based on the first visible light image and the infrared light image, wherein the first reference image has a pixel value equal to X+Y;
obtaining a second reference image of the target object using the second visible light image of the second image sensor, wherein the second reference image corresponds to the second visible light image and has a pixel value equal to X+Y; and
calculating the depth information of the target object based on the first reference image and the second reference image; and
obtain the depth information of the target object using the structured light manner when the distance between the target object and the photographing device is less than an effective distance of the binocular manner.

2. The photographing device of claim 1, wherein the processor being configured to obtain the depth information of the target object using the binocular manner, and obtain the depth information of the target object using the structured light manner comprises the processor being configured to:
attempt to obtain the depth information of the target object using the binocular manner; and
obtain the depth information of the target object using the structured light manner when the depth information of the target object cannot be obtained using the binocular manner.

3. The photographing device of claim 1, wherein the processor being configured to obtain the depth information of the target object using the binocular manner, and obtain the depth information of the target object using the structured light manner comprises the processor being configured to:
attempt to obtain the depth information of the target object using the structured light manner; and
obtain the depth information of the target object using the binocular manner when the depth information of the target object cannot be obtained using the structured light manner.

4. The photographing device of claim 1, wherein the processor being configured to obtain the depth information of the target object using the binocular manner, and obtain the depth information of the target object using the structured light manner comprises the processor being configured to:
measure the distance between the target object and the photographing device;
obtain the depth information of the target object using the binocular manner when the distance between the target object and the photographing device is greater than a first preset value; and
obtain the depth information of the target object using the structured light manner when the distance between the target object and the photographing device is less than a second preset value.

5. The photographing device of claim 1, wherein the processor being configured to obtain the depth information of the target object using the structured light manner comprises the processor being configured to:
project the particular pattern to the target object using the infrared light source;
obtain, using the first image sensor, a reference pattern that is formed using depth modulation of the target object after the particular pattern is projected to the target object; and
calculate the depth information of the target object according to the reference pattern.

6. The photographing device of claim 1, wherein M is equal to ⅓ of N.

7. The photographing device of claim 1, wherein the effective distance of the binocular manner is one meter.

8. A method for obtaining depth information, the method comprising:

obtaining depth information of a target object using a binocular manner when a distance between the target object and a photographing device is greater than an effective distance of a structured light manner, depth information of the target object using a binocular manner by:
  obtaining a first visible light image and an infrared light image of the target object using a first image sensor, wherein a pixel value of the first visible light image is equal to X, and wherein a pixel value of the infrared light image is equal to Y;
  obtaining a first reference image based on the first visible light image and the infrared light image, wherein the first reference image has a pixel value equal to X+Y;
  obtaining a second reference image of the target object using a second visible light image obtained using a second image sensor, wherein the second reference image corresponds to the second visible light image and has a pixel value equal to X+Y; and
  calculating the depth information of the target object based on the first reference image and the second reference image; and
obtaining the depth information of the target object using the structured light manner when the distance between the target object and the photographing device is less than an effective distance of the binocular manner.

9. The method of claim 8, wherein obtaining the depth information of the target object using a binocular manner, and obtaining the depth information of the target object using the structured light manner comprises:
  attempting to obtain the depth information of the target object using the binocular manner; and
  obtaining the depth information of the target object using the structured light manner when the depth information of the target object cannot be obtained using the binocular manner.

10. The method of claim 8, wherein obtaining the depth information of the target object using a binocular manner, and obtaining the depth information of the target object using the structured light manner comprises:
  attempting to obtain the depth information of the target object using the structured light manner; and
  obtaining the depth information of the target object using the binocular manner when the depth information of the target object cannot be obtained using the structured light manner.

11. The method of claim 8, wherein obtaining the depth information of the target object using the binocular manner, and obtaining the depth information of the target object using the structured light manner comprises:
  measuring the distance between the target object and the photographing device;
  obtaining the depth information of the target object using the binocular manner when the distance between the target object and the photographing device is greater than a first preset value; and
  obtaining the depth information of target object using the structured light manner when the distance between the target object and the photographing device is less than a second preset value.

12. The method of claim 8, wherein obtaining the depth information of the target object using the structured light manner comprises:
  projecting a particular pattern to the target object using an infrared light source;
  obtaining, using the first image sensor, a reference pattern that is formed using depth modulation of the target object after the particular pattern is projected to the target object; and
  calculating the depth information of the target object according to the reference pattern.

13. The method of claim 8, wherein the first image sensor comprises M infrared light sensing pixels and N visible light sensing pixels, and wherein M is equal to ⅓ of N.

14. The method of claim 8, wherein the effective distance of the binocular manner is one meter.

15. A photographing device, comprising:
  a plurality of sensors; and
  a processor coupled to the plurality of sensors and configured to:
    obtain depth information of a target object using binocular manner when a distance between the target object and the photographing device is greater than an effective distance of a structured light manner by:
      obtaining a first visible light image and an infrared light image of the target object using a first image sensor of the plurality of sensors, wherein a pixel value of the first visible light image is equal to X, and wherein a pixel value of the infrared light image is equal to Y;
      obtaining a first reference image based on the first visible light image and the infrared light image, wherein the first reference image has a pixel value equal to X+Y;
      obtaining a second reference image of the target object using a second visible light image obtained using a second image sensor of the plurality of sensors, wherein the second reference image corresponds to the second visible light image acid has a pixel value equal to X+Y; and
      calculating the depth information of the target object based on the first reference image and the second reference image; and
    obtain the depth information of the target object using the structured light manner when the distance between the target object and the photographing device is less than an effective distance of the binocular manner.

16. The photographing device of claim 15, wherein the processor is further configured to:
  attempt to obtain the depth information of the target object using the binocular manner; and
  obtain the depth information of the target object using the structured light manner when the depth information of the target object cannot be obtained using the binocular manner.

17. The photographing device of claim 15, wherein the processor is further configured to:
  attempt to obtain the depth information of the target object using the structured light manner; and
  obtain the depth information of the target object using the binocular manner when the depth information of the target object cannot be obtained using the structured light manner.

18. The photographing device of claim 15, wherein the photographing device further comprises a measurement device configured to measure the distance between the target object and the photographing device, wherein when the measurement device determines that the distance between the target object and the photographing device is greater than a first preset value, the processor obtains the depth information of the target object using the binocular manner, and wherein when the measurement device determines that the distance between the target object and the photographing device is less than a second preset value, the processor obtains the depth information of the target object using the structured light manner.

* * * * *

UNITED STATES PATENT AND TRADEMARK OFFICE
CERTIFICATE OF CORRECTION

PATENT NO.         : 10,560,686 B2                                Page 1 of 1
APPLICATION NO.    : 15/739600
DATED              : February 11, 2020
INVENTOR(S)        : Yu Xu and Mouzheng Fu It is certified that error appears in the above-identified patent and that said Letters Patent is hereby corrected as shown below:

In the Claims

Claim 15, Column 16, Line 34: "image acid has" should read "image and has"

Signed and Sealed this
Fifth Day of May, 2020

Andrei Iancu
*Director of the United States Patent and Trademark Office*